US010708403B2

(12) United States Patent
Mody (10) Patent No.: US 10,708,403 B2
(45) Date of Patent: Jul. 7, 2020

(54) ELECTRONIC DEVICE CASE WITH A TRANSPARENT OR TRANSLUCENT BACK PANEL (71) Applicant: CASE-MATE, INC., Atlanta, GA (US)

(72) Inventor: Saumil Chetan Mody, Atlanta, GA (US)

(73) Assignee: CASE-MATE, INC., Atlanta, GA (US)

(*) Notice: Subject to any disclaimer, the term of this patent is extended or adjusted under 35 U.S.C. 154(b) by 0 days.

(21) Appl. No.: 16/519,116

(22) Filed: Jul. 23, 2019

(65) Prior Publication Data
US 2020/0028950 A1 Jan. 23, 2020

Related U.S. Application Data (60) Provisional application No. 62/701,912, filed on Jul. 23, 2018.

(51) Int. Cl.
H04M 1/02 (2006.01)
B32B 27/36 (2006.01)
G06F 1/16 (2006.01)

(52) U.S. Cl.
CPC ......... H04M 1/0283 (2013.01); B32B 27/365 (2013.01); G06F 1/1626 (2013.01); G06F 2200/1631 (2013.01)

(58) Field of Classification Search
CPC combination set(s) only.
See application file for complete search history.

(56) References Cited

U.S. PATENT DOCUMENTS

| 6,052,279 | A | * | 4/2000 | Friend | G06F 1/1626 361/679.32 |
| 6,646,866 | B2 | * | 11/2003 | Kao | G06F 1/1626 312/216 |
| 7,031,148 | B1 | * | 4/2006 | Lin | G06F 1/1616 150/154 |
| 7,312,984 | B2 | * | 12/2007 | Richardson | G06F 1/1626 206/701 |
| 7,609,512 | B2 | * | 10/2009 | Richardson | G06F 1/1626 361/679.41 |
| 7,643,274 | B2 | * | 1/2010 | Bekele | G06F 1/1616 361/679.02 |
| 7,933,122 | B2 | * | 4/2011 | Richardson | H05K 5/0017 361/679.55 |
| 7,957,524 | B2 | * | 6/2011 | Chipping | G06F 1/1616 206/320 |
| 8,395,894 | B2 | * | 3/2013 | Richardson | H05K 5/0017 361/679.55 |

(Continued)

Primary Examiner — Lisa Lea-Edmonds
(74) Attorney, Agent, or Firm — Gardner Groff & Greenwald, PC (57) ABSTRACT An electronic device case with a transparent or translucent back panel. The case generally comprises a frame, configured to surround the outer periphery of the electronic device, coupled to a back panel, configured to cover the back of the electronic device. The frame generally includes a plurality of outer sidewalls surrounding a center cutout. The back panel is formed from a hard plastic material such as polycarbonate. In example embodiments, the back panel material is a clear, transparent material. In other embodiments, the back panel material is a tinted or translucent material. The frame is generally overmolded onto the front or interior surface of the back panel.

35 Claims, 10 Drawing Sheets

(56) References Cited

U.S. PATENT DOCUMENTS

| | | | | |
|---|---|---|---|---|
| 8,644,011 B2* | 2/2014 | Parkinson | B29C 33/485 | |
| | | | 224/191 | |
| 8,824,140 B2* | 9/2014 | Prest | H04M 1/0249 | |
| | | | 361/679.56 | |
| 8,922,985 B2* | 12/2014 | Richardson | G06F 1/1626 | |
| | | | 361/679.3 | |
| 9,071,674 B2* | 6/2015 | Yow | H04M 1/0283 | |
| 9,469,469 B2* | 10/2016 | Rayner | G06F 1/1626 | |
| 10,005,611 B2* | 6/2018 | Rayner | G06F 1/1626 | |
| 10,294,016 B2* | 5/2019 | Rayner | G06F 1/1626 | |
| 10,396,843 B2* | 8/2019 | Rayner | H01L 23/10 | |
| 10,484,035 B2* | 11/2019 | Flores | H04M 1/185 | |
| 2014/0152890 A1* | 6/2014 | Rayner | G06F 1/1626 | |
| | | | 348/376 | |
| 2014/0192481 A1* | 7/2014 | Wojcik | H05K 5/0086 | |
| | | | 361/679.55 | |
| 2016/0198824 A1* | 7/2016 | Rayner | G06F 1/1626 | |
| | | | 224/191 | |
| 2017/0366217 A1* | 12/2017 | Bergreen | H04M 1/185 | |
| 2018/0237214 A1* | 8/2018 | Rayner | G06F 1/1626 | |
| 2018/0359343 A1* | 12/2018 | Lee | H04B 1/3888 | |
| 2019/0013832 A1* | 1/2019 | Mody | G06F 1/1656 | |

* cited by examiner

_fig.3_

_fig.4_    _fig.5_ fig.11 fig.13 fig.14

ELECTRONIC DEVICE CASE WITH A TRANSPARENT OR TRANSLUCENT BACK PANEL

CROSS-REFERENCE TO RELATED APPLICATION

This application claims the benefit of U.S. Provisional Patent Application Ser. No. 62/701,912 filed Jul. 23, 2018, the entirety of which is hereby incorporated herein by reference for all purposes.

TECHNICAL FIELD

The present invention relates generally to the field of protective cases or covers for cell phones and other electronic devices, and more particularly to a protective and/or decorative case having a transparent or translucent back panel.

BACKGROUND

Cases and covers for mobile phones, tablet computers and other handheld electronic devices may include ornamental decorative elements or visual displays. Continuing improvements in the field are sought. It is to the provision of an electronic device case with a transparent or translucent back panel meeting these and other needs that the present invention is primarily directed.

SUMMARY

In example embodiments, the present invention provides an electronic device case with a transparent or translucent back panel. The case generally comprises a frame, configured to surround the outer periphery of the electronic device, coupled to a back panel, configured to cover the back of the electronic device. The frame generally includes a plurality of outer sidewalls surrounding a center cutout. The back panel is formed from a hard plastic material such as polycarbonate. In example embodiments, the back panel material is a clear, transparent material. In other embodiments, the back panel material is a tinted or translucent material. The frame is generally overmolded onto the front or interior surface of the back panel.

In one aspect, the present invention relates to a case for a portable electronic device comprising a resilient, flexible frame configured to extend around an outer periphery of the device and a rigid back panel configured to cover the back of the device, wherein the back panel is either transparent or translucent, the back panel comprising a front, interior surface and a back, exterior surface; wherein the frame is overmolded onto the front, interior surface of the back panel.

In another aspect, the present invention relates to a case for a portable electronic device including a resilient, flexible frame and a rigid back panel. The frame is configured to extend around an outer periphery of the device and the back panel is configured to cover the back of the device. In example embodiments, the back panel is either transparent or translucent and includes a front, interior surface and a back, exterior surface. In example embodiments, the frame is overmolded onto the front, interior surface of the back panel.

In example embodiments, the frame is formed from thermoplastic polyurethane. In example embodiments, the back panel is formed from polycarbonate. In example embodiments, the back panel is tinted a florescent color. In example embodiments, the back panel frame includes a rib positioned on a front surface thereof that is configured for engagement with a slot of the frame.

In example embodiments, the case further includes at least one button, wherein the button is configured to engage a cutout in the frame, the cutout being positioned to align with a button on the portable electronic device. In example embodiments, the design of the button and the design of the cutout in the frame automatically adjusts the position of the button within the cutout, allowing a single button to accommodate device buttons having different button tolerance variations.

In example embodiments, the back panel includes a cavity for sealingly containing one or more materials. In example embodiments, the back panel further includes a recess and an inset shelf surrounding the recess, wherein the recess and inset shelf are formed along a front, interior portion of the back panel. In example embodiments, the case further includes a panel attached to the inset shelf of the back panel such that a cavity is defined between the panel and the back panel. In example embodiments, the case further including a second panel configured for attachment to the back panel so as to define two cavities. In example embodiments, the case further including a recess formed on a back, exterior portion of the back panel. In example embodiments, the back panel further includes at least one layer of epoxy occupying the cavity. In example embodiments, the case further including at least one design element deposited in the recess and contained therein by the epoxy.

In yet another aspect, the invention relates to a case for an electronic device including a back panel and a frame. The back panel includes a bevel provided along at least a portion of the outer perimeter thereof. The frame includes a plurality of outer sidewalls surrounding a center cutout. In example embodiments, the frame is overmolded to the back panel.

In example embodiments, the back panel is configured to absorb, internally reflect and re-emit light particles so as to provide unique visual observations when viewing the back panel or bevel thereof. In example embodiments, the back panel is configured to produce an edge glow effect along the bevel thereof, the edge glow effect being visible to an observer when the observer is generally positioned and oriented to be viewing the beveled surface in a direction that is substantially transverse to an outer surface of the back panel.

In example embodiments, the frame includes thermoplastic polyurethane. In example embodiments, the back panel includes polycarbonate. In example embodiments, the back panel is tinted a florescent color. In example embodiments, the back panel includes a cavity for sealingly containing one or more materials. In example embodiments, the case further includes a recess and an inset shelf surrounding the recess. In example embodiments, the recess and inset shelf are formed along a front, interior portion of the back panel. In example embodiments, the case further includes a panel attached to the inset shelf of the back panel such that a cavity is defined between the panel and the back panel. In example embodiments, the case further includes a second panel configured for attachment to the back panel so as to define two cavities.

In yet another example embodiment, the present invention relates to a back panel for an electronic device case including a substantially planar and transparent or translucent panel defining a thickness and an outer perimeter. The panel includes a bevel provided along at least a portion of the outer perimeter thereof. In example embodiments, the back panel is configured to absorb, internally reflect and re-emit ultraviolet light particles in the visible spectrum so as to provide unique visual observations when viewing the back panel or bevel thereof. In example embodiments, the back panel is configured to produce an edge glow effect along the bevel thereof, the edge glow effect being visible to an observer when the observer is generally positioned and oriented to be viewing the beveled These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-10 show an electronic device case 10 with a transparent or translucent back panel 50 according to an example embodiment of the invention. The case 10 defines a space or housing for receiving an electronic device D such as a smart phone or tablet computer. The case generally comprises a frame 20, configured to surround the outer periphery of the electronic device, coupled to a back panel 50, configured to cover the back of the electronic device.

Figure 1:
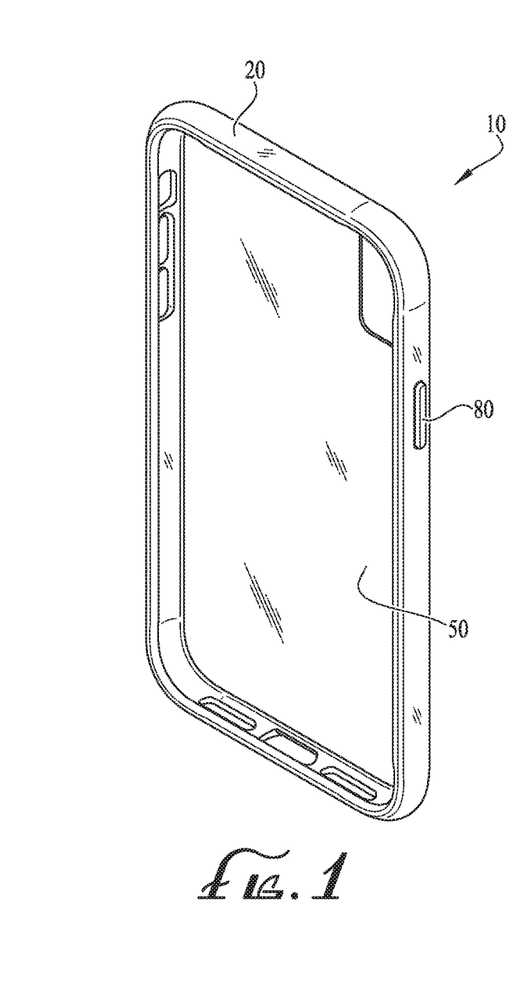
FIG. 1 is a perspective view an electronic device case according to an example embodiment of the present invention.
Figure 2:
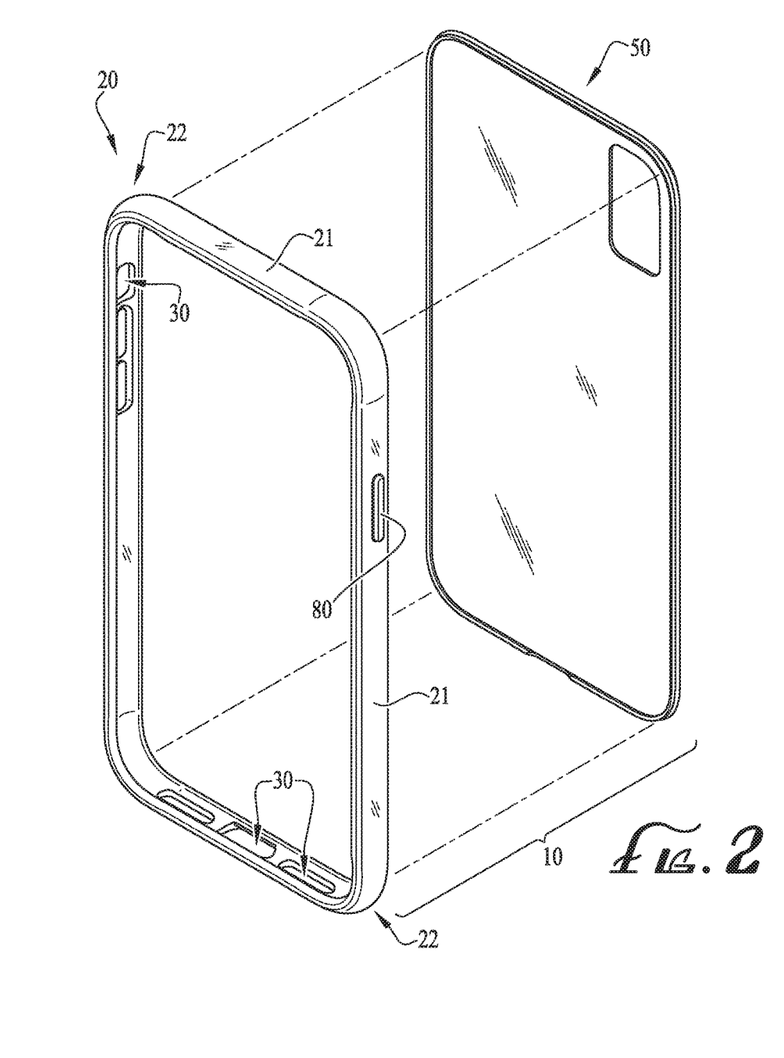
FIG. 2 is an exploded perspective view of the electronic device case of FIG. 1, showing a frame that is overmolded on a portion of a back panel.

The frame 20 generally includes a plurality of outer sidewalls 21 that are connected by corners 22 and surrounding a center cutout. According to example embodiments, the frame 20 comprises one or more cutouts 30 that are configured to provide access to one or more portions of the electronic device D when the case 10 is assembled with the electronic device D. As will be described below, one or more buttons 80 can optionally be provided for movable engagement within the cutouts to facilitate access or manipulation of one or more portions of the electronic device D. The frame 20 can be formed of a soft, relatively flexible material, for example thermoplastic polyurethane (TPU). The frame 20 is configured to be resilient to allow the device to be push fitted into the frame. In example embodiments, the frame material is a clear, transparent material. In other embodiments, the frame material is a tinted or translucent material. In alternate embodiments, the frame material is opaque. The back panel 50 is formed from a hard plastic material such as polycarbonate. In example embodiments, the back panel material is a clear, transparent material. In other embodiments, the back panel material is a tinted or translucent material. According to example embodiments, the back panel 50 comprises a cutout 51 that is configured to provide access to other portions of the electronic device D, for example, a camera or other component of the electronic device D.

Figure 3:
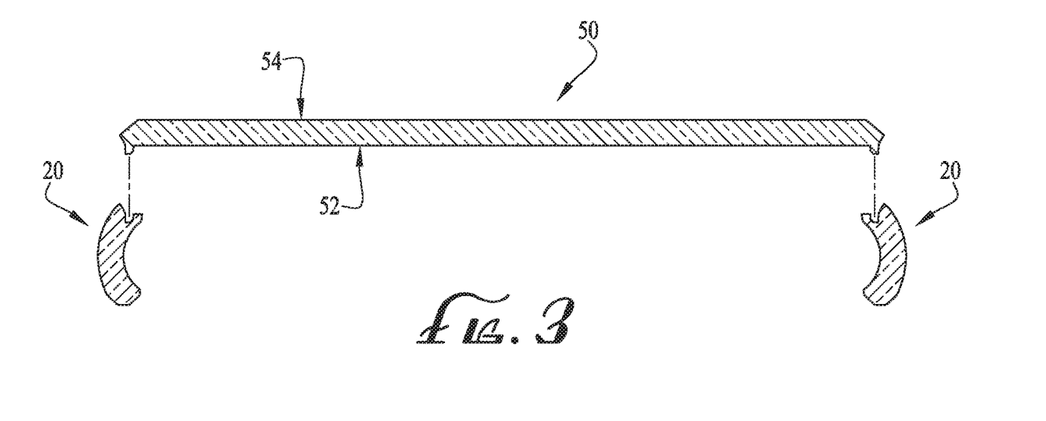
FIG. 3 is a cross sectional view of the electronic device case of FIG. 2, showing the coupling interengagement of the frame and back panel to be provided during overmolding of the frame with the back panel.
Figure 4:
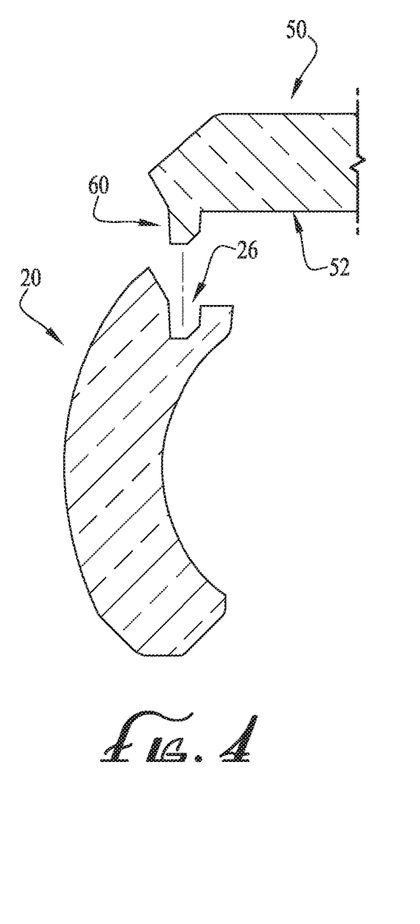
FIG. 4 shows a detailed view of the cross sectional view of FIG. 3, showing further details of the interengagegment of the frame with the back panel.
Figure 5:
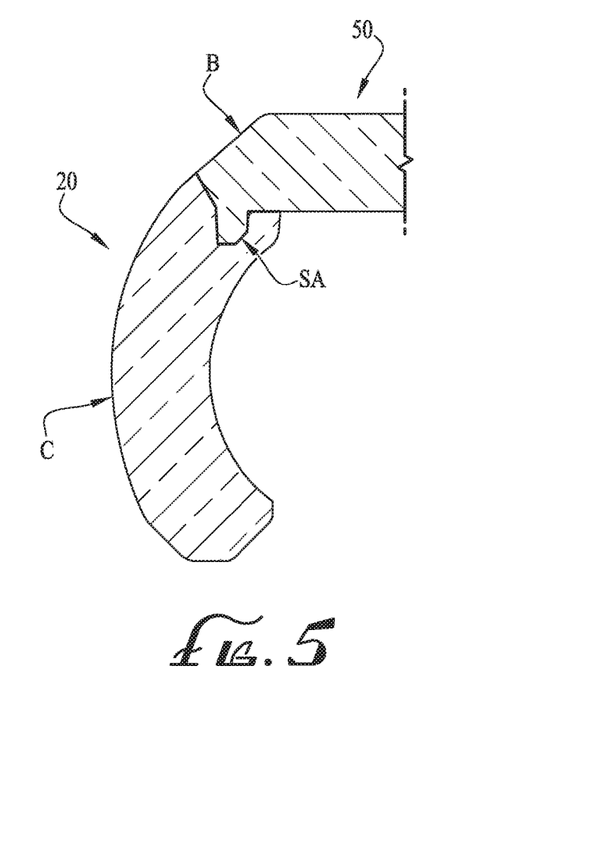
FIG. 5 shows a detailed view of the frame and back panel of FIG. 4, showing the interengagement features of the frame and back panel coupled together after overmolding of the frame with the back panel.

In example embodiments, the frame 20 is generally overmolded onto the front or interior surface 52 of the back panel 50. According to one example embodiment, the case 10 includes a slot and a rib to facilitate the coupling of the frame 20 to the back panel 50. As best shown in FIGS. 3-5, the frame 20 includes a groove or slot 26 extending along a portion of the back surface of the frame. In example embodiments, the slot 26 extends around the entire back surface. In other embodiments, the slot 26 extends around only a portion of the back surface of frame. The back panel 50 includes a corresponding rib 60 positioned on its front surface. The rib 60 is configured to be positioned in the slot 26 of the frame 20 when the frame is over molded onto the back panel. In example embodiments, the back surface of the frame includes sufficient surface area SA around the groove to ensure adequate bonding between the two bodies during the over molding process.

The outer surface of the frame 20 is generally curved (see C). In example embodiments, the outer perimeter of the back panel 50 comprises a bevel B. The bevel B of the back panel 50 can be dimensioned to align with the curve C of the outer surface of the frame 20 to give the case the appearance of a unitary piece (see FIG. 5). According to example embodiments, since the frame 20 is overmolded to the back panel 50, a substantially smooth transition is provided between the outer surface of the frame 20 and the bevel B. For example, as the frame 20 is overmolded on the front surface of the back panel 50, any voids present in the mold (e.g., generally near the connection of the frame 20 and the back panel 50) will become occupied by the material of the frame 20, and thus, provide a substantially smooth transition therebetween so as to appear as if the case 10 is a single, unitary piece.

Figure 6:
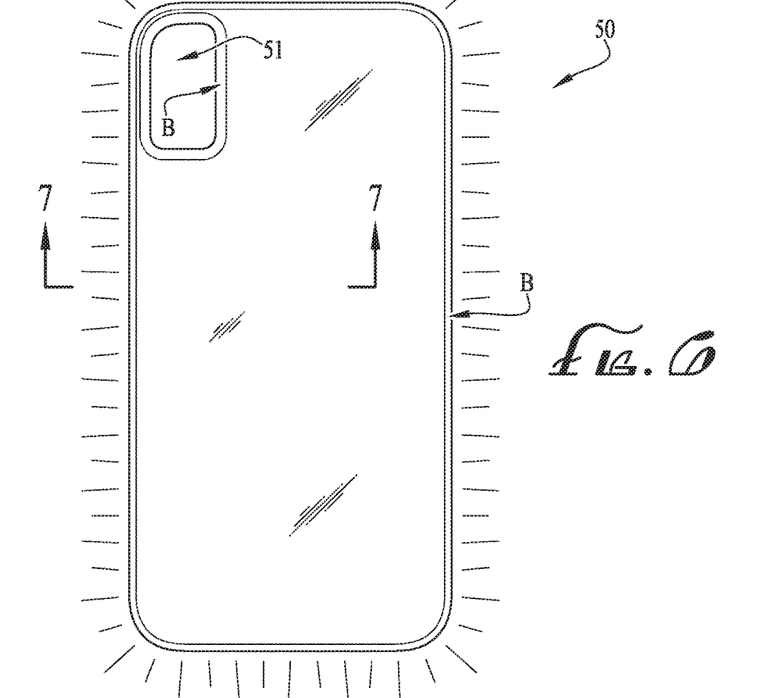
FIG. 6 show a plan view of the back panel of the case of FIG. 1.
Figure 7:
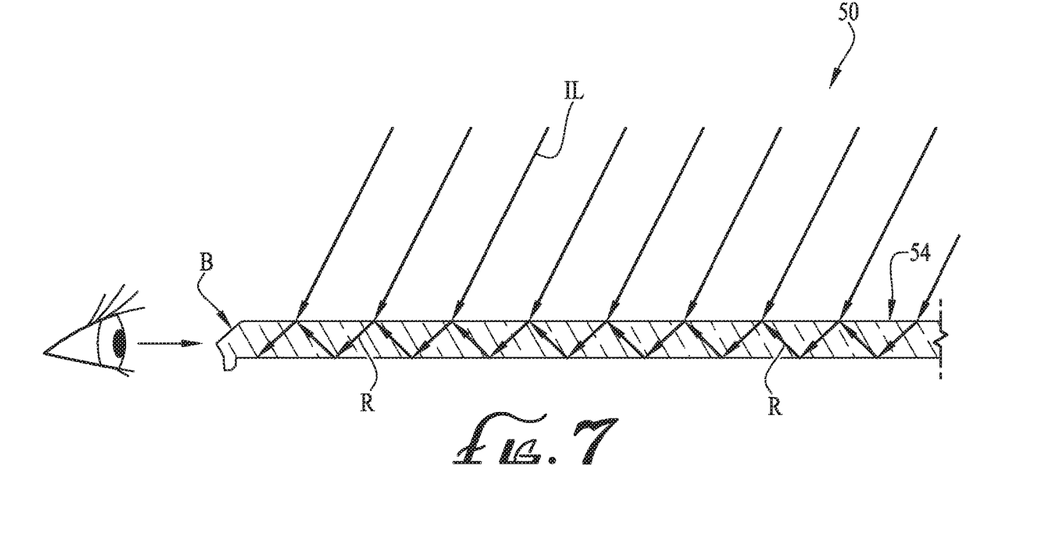
FIG. 7 shows a cross sectional view of the back panel of FIG. 6 taken along line 7-7, and showing the pathways of light that is exposed to the back panel and an edge glow effect caused by the exposed light.

In example embodiments, the back panel 50 is formed from a bright, neon or fluorescent color to give the material a glow appearance, especially at the edges. As best seen in FIGS. 6-7, when the incident light IL exceeds the critical angle on the surface 54 of the back panel 50, the light is reflected internally through the back panel material (see R). The fluorescent color in the back panel 50 absorbs ultraviolet light and re-emits the light in the visible spectrum or region, which is observed as an edge glow effect though the beveled surface B around the outer periphery of the back panel 50.

For example, as depicted in FIG. 7, the edge glow effect is visible to an observer OB when the observer OB is generally positioned and oriented to be viewing the beveled surface B in a direction that is substantially transverse to the outer surface 54 of the back panel 50. According to some example embodiments, when the observer OB is positioned and oriented to view the beveled edge B from a direction that is substantially transverse the beveled edge B, the edge glow effect is invisible. However, as the observer OB changes their orientation and position so that they are viewing the beveled edge B from a direction generally transverse the outer surface 54 of the back panel 50 (as depicted in FIG. 7), the edge glow effect becomes visible. According to some example embodiments, the cutout 51 of the back panel can similarly comprise a bevel B, for example, so as to similarly provide an edge glow effect.

Figure 8:
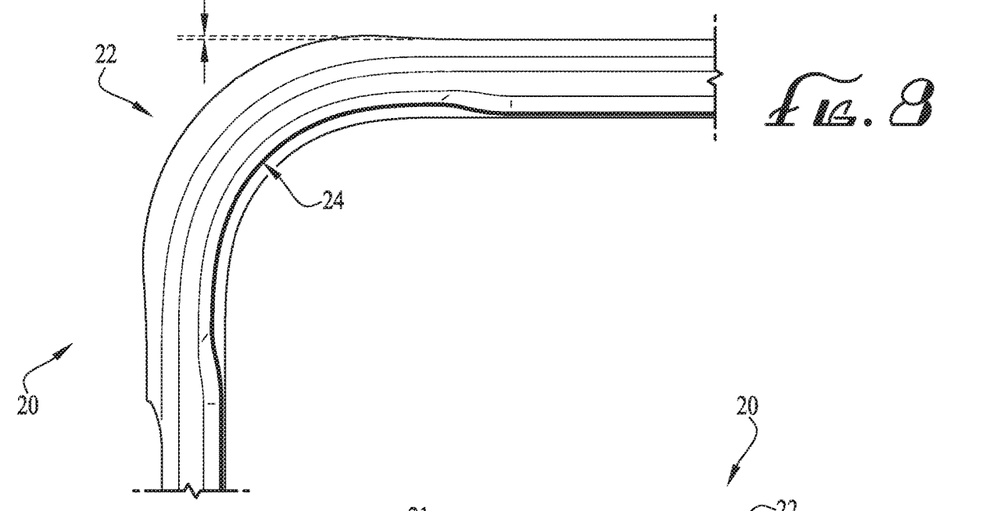
FIG. 8 shows a perspective view of a portion of the frame of the electronic device case of FIGS. 1-2.
Figures 9, 10:
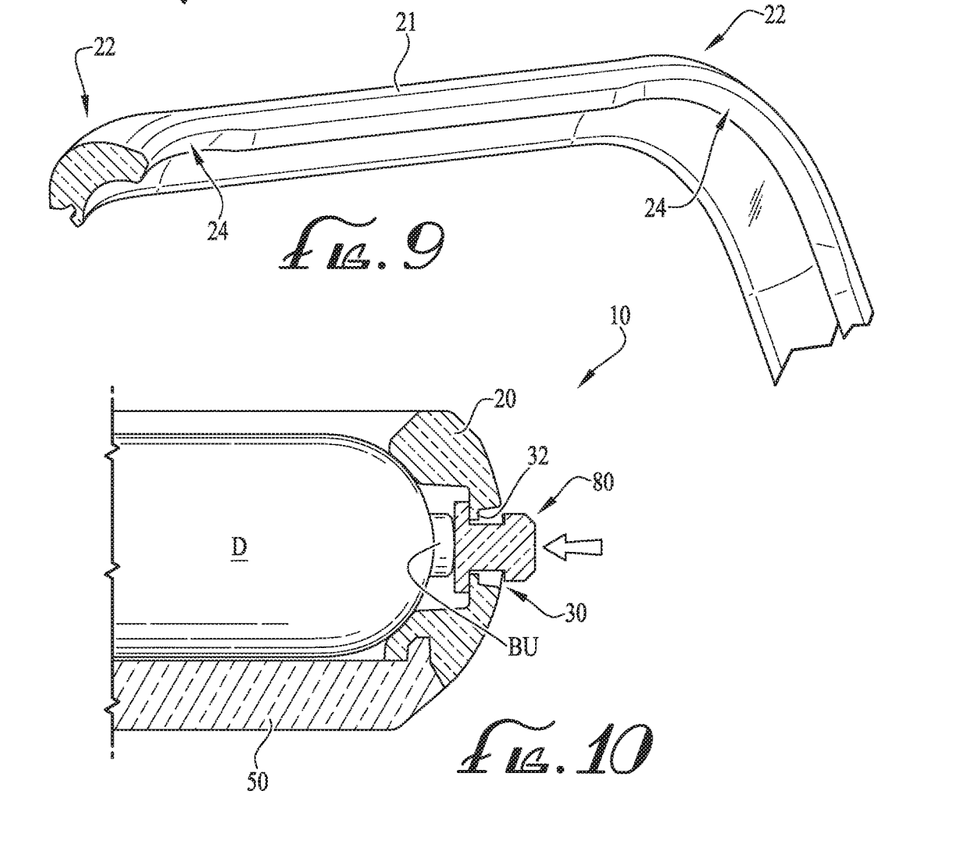
FIG. 9 shows a perspective view of a portion of the frame of the electronic device case of FIGS. 1-2.
FIG. 10 shows a cross sectional view of the electronic device case of FIG. 1, showing an electronic device fitted within the case and a button movably mounted to the case for operating one or more buttons of the electronic device.
Figure 11:
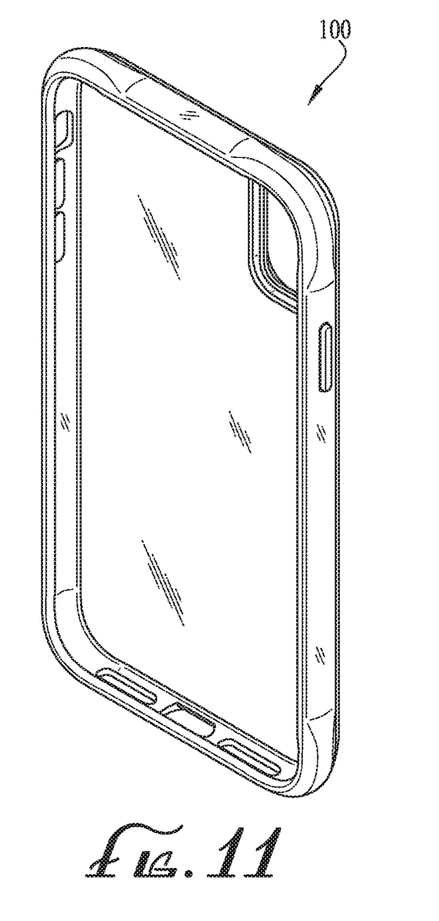
FIG. 11 shows a perspective view an electronic device case according to another example embodiment of the present invention.
Figure 12:
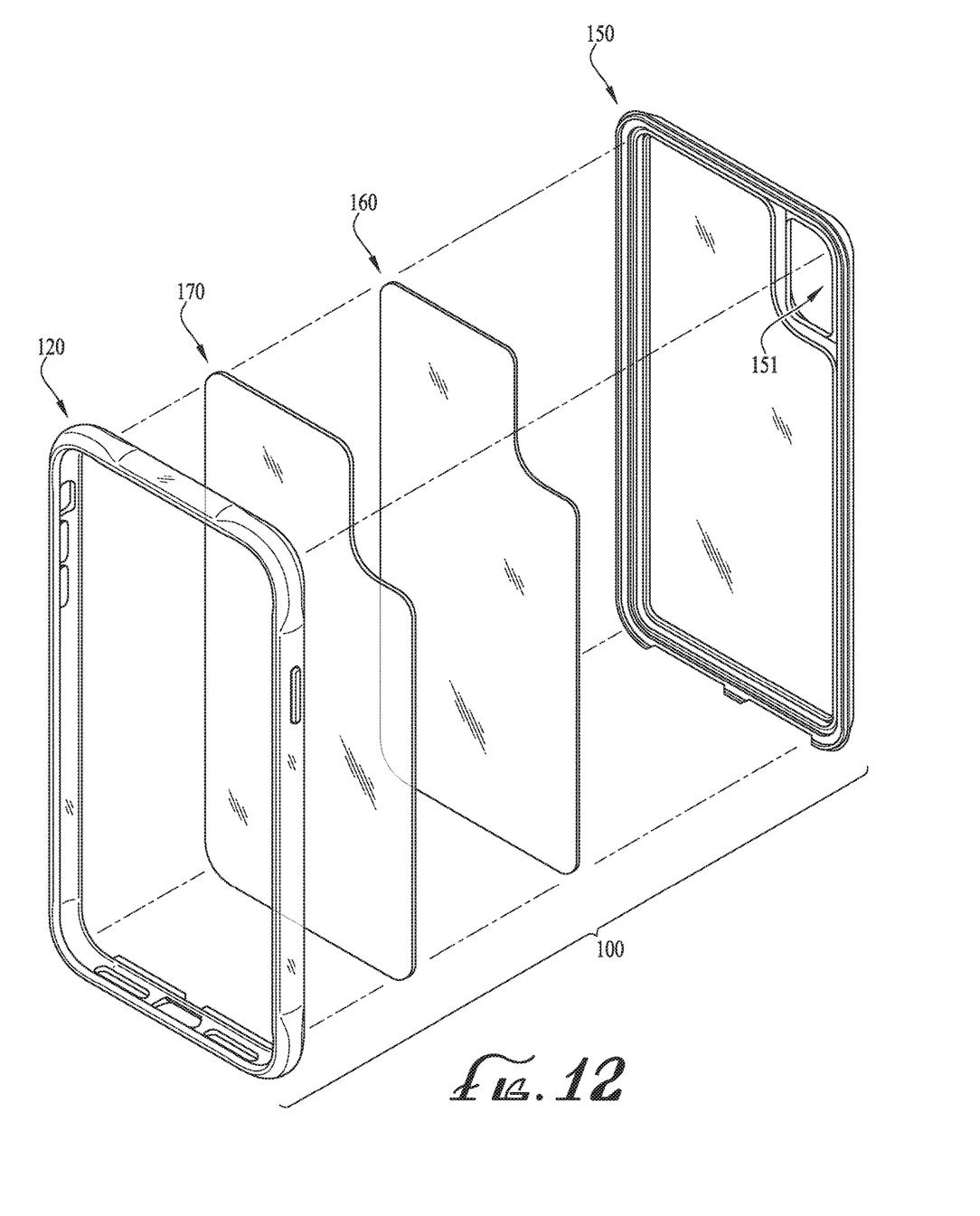
FIG. 12 is an exploded perspective view of the electronic device case of FIG. 11.
Figure 13:
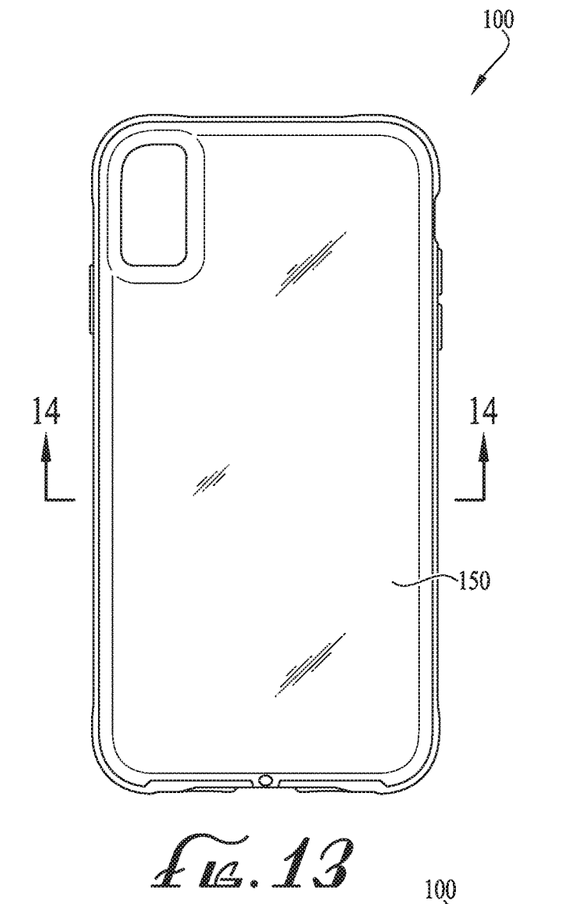
FIG. 13 shows a back view of the electronic device case of FIG. 11.

In example embodiments, the frame 20 includes raised corners 22, as best shown in FIGS. 8-9. The raised corners 22 are thicker than the rest of the sidewalls 21 to provide impact protection and cushion when the device is accidentally dropped. In example embodiments, the corners 22 of the frame 20 are raised a thickness T beyond the rest of the outer surface. According to example embodiments, the thickness T is about 0.6 millimeters. In optional example embodiments, the corners 22 can be substantially flush or generally equal with the outer surface of the frame 20, for example, the corners 22 can be configured to comprise a thickness T that is greater or less than 0.6 millimeters relative to the outer surface of the sidewalls 21 of the frame 20.

According to example embodiments, the raised corners 22 comprise a reduction in the lip that is configured for covering the corners of the electronic device, for example, so as to allow for easier insertion and removal of the device to/from the case 10. For example, as depicted in FIGS. 8-9, each corner 22 comprises a cutout portion 24 formed along an inner portion thereof, for example, so as to reduce the overhang of the lip or sidewall overhang, and thus facilitate easy case assembly and disassembly with the electronic device. According to one example embodiment, the cutout is substantially similar dimensionally relative to the raised corners 22.

For example, as the corners 22 are raised by a thickness T, the cutouts 24 are similarly configured so as to remove a thickness from the lip or sidewall overhang. Thus, according to one example embodiment, the corners are raised by a thickness of about 0.6 millimeters and the cutout portions remove about 0.6 millimeters from the lip or sidewall overhang of each corner 22. In other example embodiments, the thickness of the cutouts can be greater or less than the thickness T of the raised corners 22.

In example embodiments, the case 10 can include one or more buttons 80 that are positioned in cutouts 30 of the frame 20. According to example embodiments, the buttons 80 are positioned relative to the frame 20 so as to substantially align with buttons BU of the electronic device D when the electronic device D is fitted within the case 10. For example, as the buttons BU of the electronic device D can be substantially covered or concealed from access once the case 10 is assembled with the electronic device D, the buttons 80 of the case 10 preferably allow access thereto, for example, such that actuation of the buttons 80 causes actuation of the buttons BU of the electronic device D.

In example embodiments, each button 80 can be formed of polycarbonate or another injected molded material and is generally configured to engage one or more buttons BU of the device D, such as the volume control and power buttons. According to example embodiments of the present invention, the case 10 comprises one button 80 for each button BU of the electronic device D. According to some example embodiments, one or more cutouts of the case 10 can remain open without a button 80, for example, such that a user can manipulate one or more buttons, switches, etc. of the device D rather than relying on the one or more buttons 80 to act as the medium between the case 10 and the device D.

As shown in FIG. 10, the button 80 can include a T-shaped retaining feature that is configured to engage a flange 32 of the cutout 30 of the frame 20. The T-shaped retaining feature keeps the button 80 engaged with the frame 20. In example embodiments, the T-shaped retaining feature of the button 80 generally comprises a first end comprising a first dimension, a second end comprising a second dimension, and an intermediate portion between the first and second ends comprising a third dimension. In example embodiments, the first and second dimensions of the first and second ends are preferably larger than the third dimension of the intermediate portion, for example, such that the button 80 remains retained within the cutout 30 of the frame 20, and for example, wherein the flange 32 prevents separation of the button 80 from the cutout 30 while also allowing the button 80 to move relative to the cutout 30.

The button 80 and cutout 30 allows for travel in the marked direction (see arrow) to accommodate a variety of button travel distances. Generally, the distance between the case button 80 and the device button can vary depending on the type and model of the device. The button travel distance can also vary between different buttons on the same device. The design of the button 80 and the design of the cutout 30 in the frame 20 automatically adjust the position of the button 80 within the cutout 30, allowing a single button to accommodate device buttons having different button tolerance variations. The button design and opening design on the frame 20 helps automatically adjust the distance between the T-shaped retaining feature of the button 80 and the flange 32 of the frame 20 to accommodate the button travel distance.

For example, according to some example embodiments, the button BU of the device D may comprise a typical travel distance of about 0.5 millimeters, or for example, may be dimensionally under or over the typical specifications so as to provide only about 0.3 millimeters of travel or about 0.7 millimeters or more. In any case, the button 80 preferably maintains functionality and allow for manipulation or movement thereof such that the button BU of the device D can be actuated as desired. Accordingly, the button 80 and cutout 30 are configured to accommodate devices D with various button travel distances, for example, such that the buttons remain operative and functional regardless of the tolerance variations of the device D.

Figure 14:
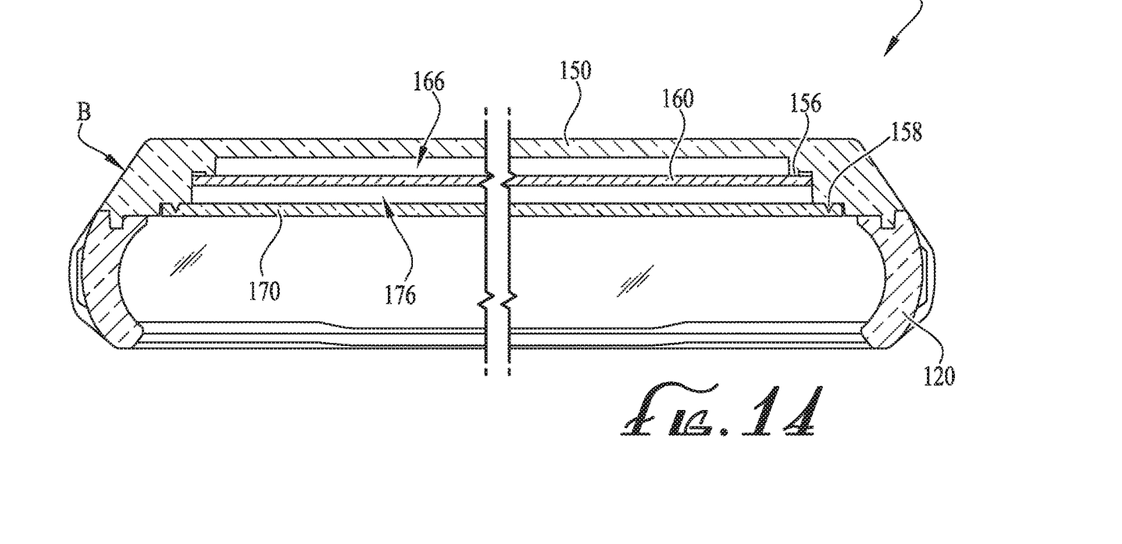
FIG. 14 shows a cross sectional view of the electronic device case of FIG. 13 taken along lines 14-14, showing a plurality of layers formed by the assembly of the components of the electronic device case.
Figure 15:
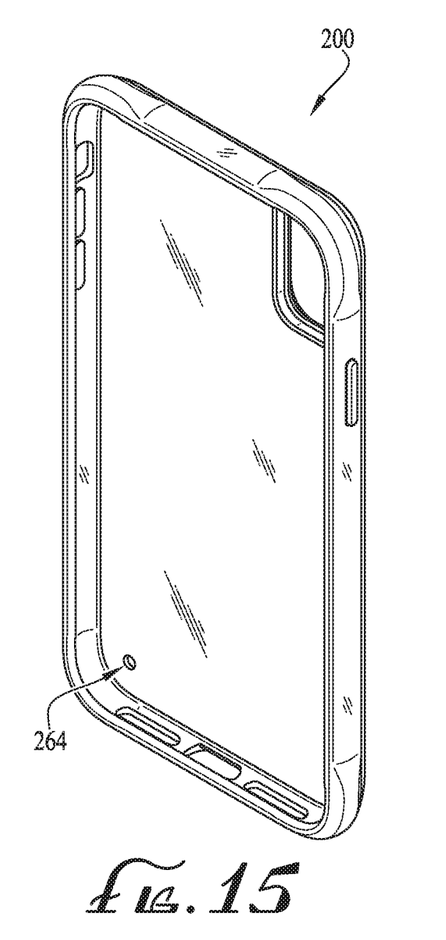
FIG. 15 shows a perspective view an electronic device case according to another example embodiment of the present invention.
Figure 16:
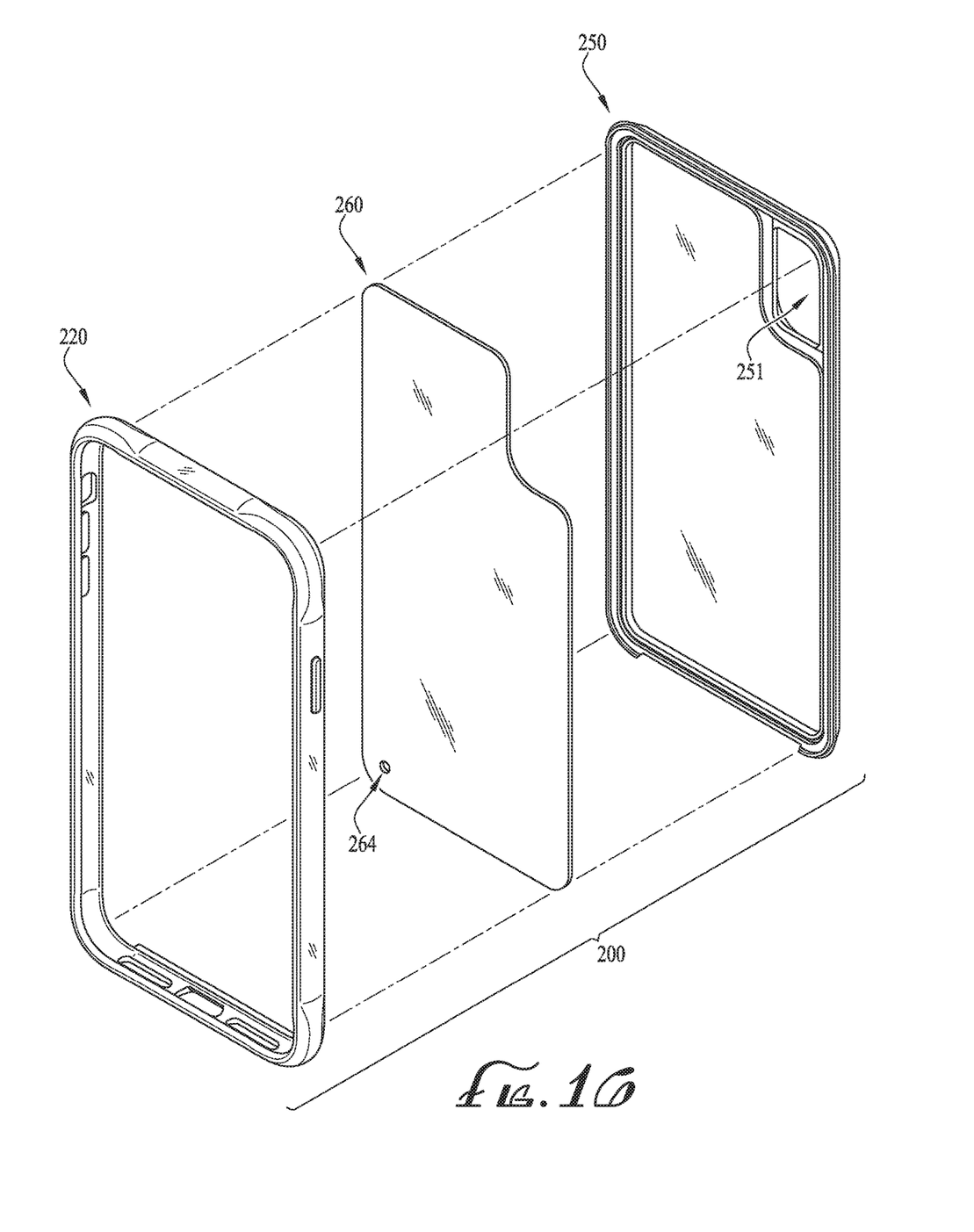
FIG. 16 is an exploded perspective view of the electronic device case of FIG. 15.
Figure 17:
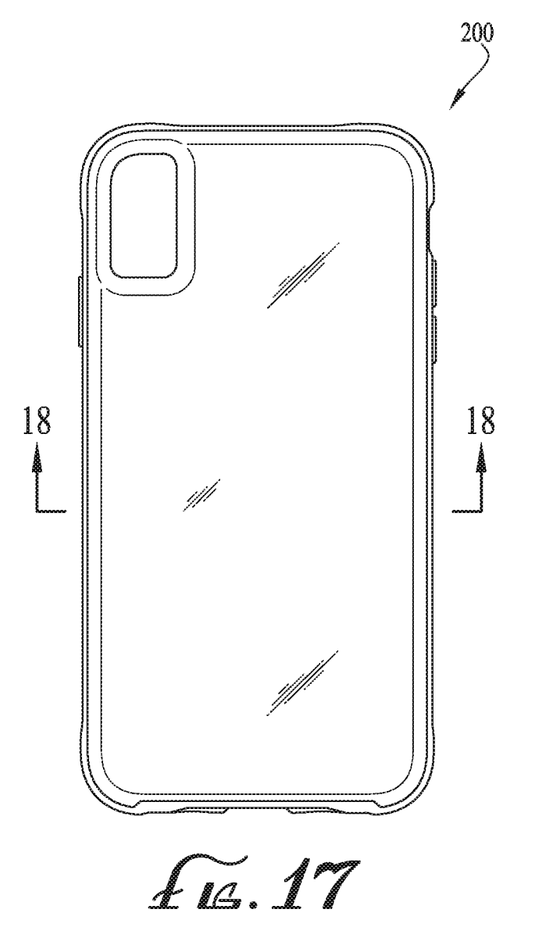
FIG. 17 shows a back view of the electronic device case of FIG. 15.

FIGS. 11-14 show an electronic device case 100 with a transparent or translucent back panel 150 according to another example embodiment of the invention. In example embodiments, the case 100 includes a frame 120 substantially similar to the previous embodiment. The back panel 150 of the case 100 includes two continuously sealed chambers (166, 176) formed on the inside surface of the back panel 150. As best seen in FIG. 14, an interior recess is provided on the front or inner surface of the back panel 150 (i.e., adjacent the space within which the electronic device is received in the case) to define an open space or void forming the chambers.

In example embodiments, the back panel 150 comprises a raised surface or shoulder 156 extending continuously around the recess to provide a sealing surface arranged along the outer periphery of the recess and spaced a distance inwardly from the front surface of the back panel. A first rigid panel 160 is bonded to the shoulder 156 to create a first cavity 166 between the bottom of the recess and the first panel 160. The first panel 160 can be formed from a hard plastic, such as polycarbonate. The back panel 150 can further comprise a lip or indention 158 extending around the periphery of the top of the recess. A second rigid panel 170 is bonded to the indention 158 to create a second cavity 176 between the first rigid panel 160 and the second panel 170. The second panel 170 can be formed from a hard plastic, such as polycarbonate. The panels 160, 170 can be attached to the back panel 150 using attachment methods such as epoxy adhesive or ultrasonic welding.

According to one example embodiment, the panel 160 is secured to the shoulder 156 by an epoxy adhesive and the panel 170 secured to the indention 158 by ultrasonic welding. In example embodiments, a thin fin or flange, for example having a triangular peaked cross-sectional configuration, projects forward from the indention 156 forming an energy director joint or boss, to form a seal between the back shell 150 and the second panel 170. In example embodiments, the seal is formed by ultrasonic welding, by pressing the panel 170 against the raised boss or energy director joint of the back panel 150. Ultrasonic energy is applied in combination with the application of pressure to melt the material of the energy director joint and fuse the panel 170 with the indention 156 of the back panel 150, with the melted material of the energy director joint forming a butt joint and making the seal. In alternative embodiments, the seal may be formed by thermal welding, solvent bonding, adhesive, one or more sealing members, overmolding, or other sealing means.

In example embodiments, each of the chambers 166, 176 can be partially or substantially fully filled with one or more liquid components, for example a lower density first liquid component and a higher density second liquid component. In example embodiments, the first and second liquid components are of different color or appearance, for example the first liquid component being substantially clear or transparent, and the second liquid component being colored; or alternatively being of contrasting colors. The back panel 150 can also be formed from the same fluorescent material as the previous embodiment to create the same beveled surface and can comprise the same edge glow effect (as described above). For example, as depicted in FIG. 14, the outer perimeter of the back panel 150 comprises a bevel B. As similarly described above, the back panel 150 comprises a cutout 151 that is configured to provide access to other portions of the electronic device D, for example, a camera or other component of the electronic device D. According to some example embodiments, the cutout 151 of the back panel can similarly comprise a bevel B, for example, so as to similarly provide an edge glow effect.

FIGS. 15-18 show an electronic device case 200 with a transparent or translucent back panel 250 according to another example embodiment of the invention. The case includes a frame 220 substantially similar to the previous embodiment. The back panel 250 of the case includes a continuously and hermetically sealed chamber 266 formed in the inside surface of the back panel 250. An interior recess can be provided in the back panel 250 on its front or inner surface (i.e., adjacent the space within which the electronic device D is received into the case 200) to define an open space or void forming the chamber.

Figure 18:
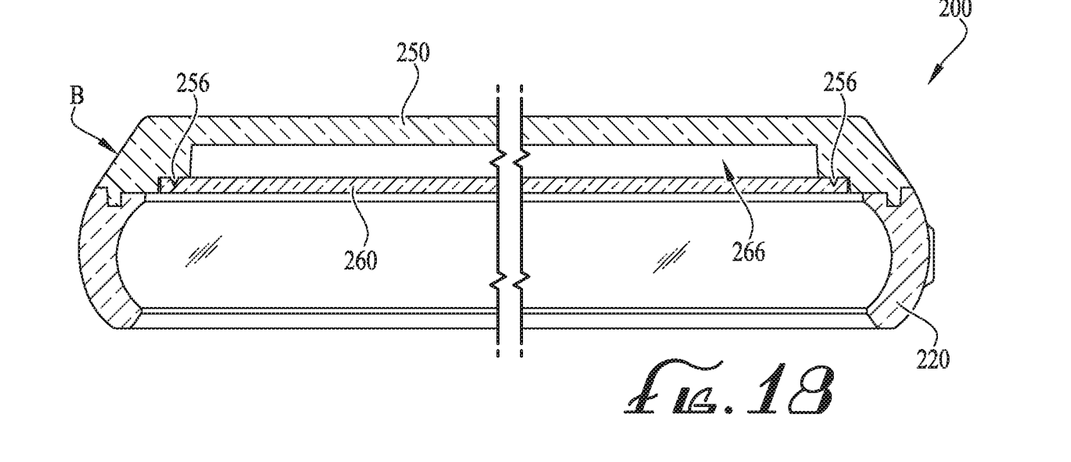
FIG. 18 shows a cross sectional view of the electronic device case of FIG. 17 taken along lines 18-18, showing a plurality of layers formed by the assembly of the components of the electronic device case.
Figure 19:
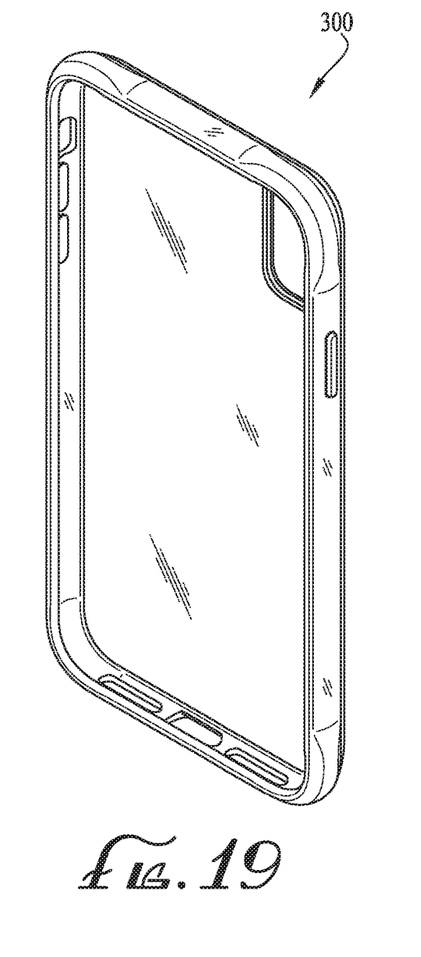
FIG. 19 shows a perspective view an electronic device case according to another example embodiment of the present invention.
Figure 20:
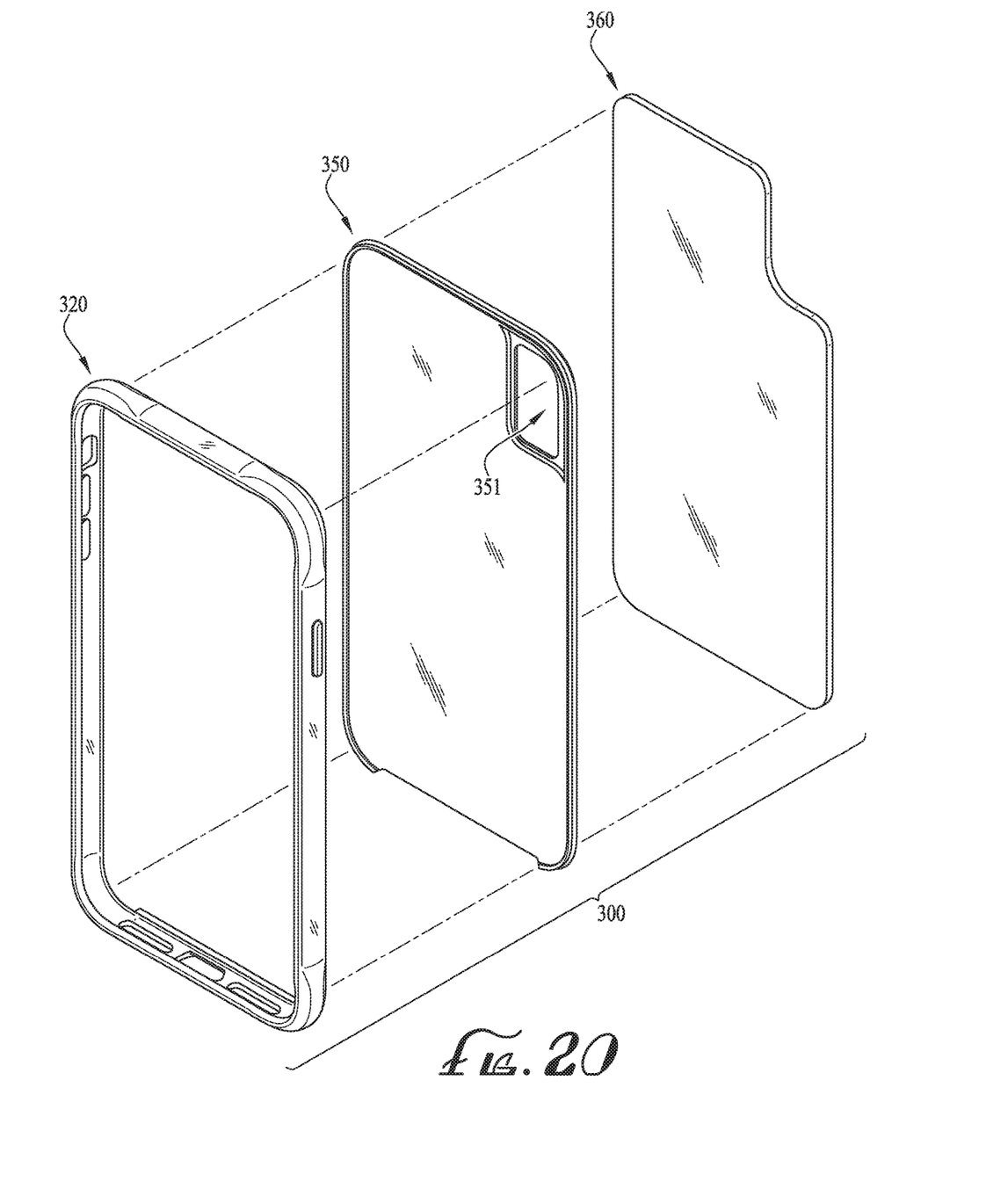
FIG. 20 is an exploded perspective view of the electronic device case of FIG. 19.
Figure 21:
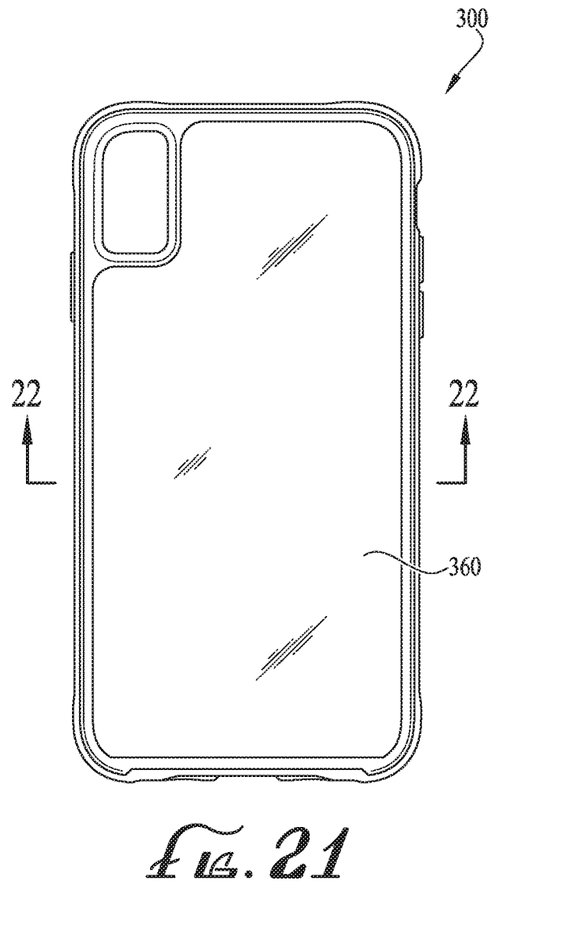
FIG. 21 shows a back view of the electronic device case of FIG. 19.
Figure 22:
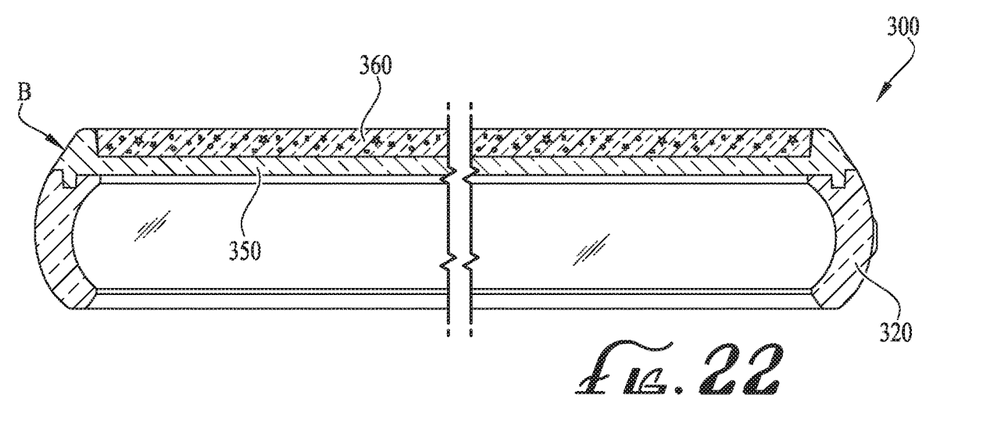
FIG. 22 shows a cross sectional view of the electronic device case of FIG. 21 taken along lines 22-22, showing a plurality of layers formed by the assembly of the components of the electronic device case.

In example embodiments, the back panel 250 comprises a raised surface or shoulder 256 extending continuously around the recess to provide a sealing surface arranged along the inside periphery of the back panel 250 and spaced a small distance inwardly from the front surface of the back panel. In example embodiments, a thin fin or flange, for example having a triangular peaked cross-sectional configuration, projects forward from the shoulder 256 forming an energy director joint or boss, to form a seal between the back shell 250 and a chamber cover 260. The chamber cover 260 can be formed from a rigid plastic material such as polycarbonate.

As best seen with reference to FIG. 18, the seal forms a continuous band to enclose and hermetically seal the chamber formed between the back panel 250 and the cover 260. Because the seal is located within the interior of the case (e.g., between a back surface of the cover 260 and the front surface of the back panel 250), it is less susceptible to contact and potential breach of the seal when the case is in use. In example embodiments, the seal is formed by ultrasonic welding, by pressing the cover 260 against the raised boss or energy director joint of the back panel 250. Ultrasonic energy is applied in combination with the application of pressure to melt the material of the energy director joint and fuse the cover 260 with the shoulder 256 of the back panel 250, with the melted material of the energy director joint forming a butt joint and making the seal. In alternative embodiments, the seal may be formed by thermal welding, solvent bonding, adhesive, one or more sealing members, overmolding, or other sealing means.

A liquid, such as mineral oil or water, and decorative elements, such as for example metallic glitter or beads, are introduced into the chamber 266 through the fill hole 264 in the cover 260. In example embodiments, at least a portion of the liquid and/or the decorative elements can include one or more fluorescent, phosphorescent or luminescent (i.e., glow-in-the-dark) materials, particles and/or elements. The fill hole 264 is closed or sealed, for example by insertion of a soft plastic stopper. In example embodiments, the stopper is formed from a thermoplastic elastomer or other soft plastic material suitable for compression fit and sealing within the fill hole 264, for example, which can comprise a smaller inner portion and a flared or expanded outer portion. According to some example embodiments, the stopper is permanently and sealingly connected with the fill hole 264 after the chamber 266 is filled as desired. According to another example embodiment, the stopper can be removably mounted to the fill hole 264, for example, so as to allow the chamber 266 to be emptied and/or refilled as desired. As similarly described above, the outer perimeter of the back panel 250 comprises a bevel B and can be formed from the same fluorescent material as the previous embodiments to create the same beveled surface and can comprise the same edge glow effect (see FIG. 18). Further, as similarly described above, the back panel 250 comprises a cutout 251 that is configured to provide access to other portions of the electronic device D, for example, a camera or other component of the electronic device D. According to some example embodiments, the cutout 251 of the back panel can similarly comprise a bevel B, for example, so as to similarly provide an edge glow effect.

FIGS. 19-22 show an electronic device case 300 with a transparent or translucent back panel 350 according to another example embodiment of the invention. In example embodiments, the case 300 includes a frame 320 substantially similar to the previous embodiments. The back panel 350 of the case 300 includes an exterior recess formed in an exterior surface thereof to define an open space or void. An epoxy mix comprising decorative elements is poured into the void. The epoxy polymerizes at room temperature and hardens, forming a cured epoxy layer 360 with decorative elements encapsulated therein. According to some example embodiments, the case 300 is not limited to a single cured epoxy layer. U.S. Published Patent Application No. US 2019/0089394, filed Sep. 29, 2018, discloses a case with multi-layer encapsulation of design elements, the entirety of which is disclosed by reference herein for all purposes. As similarly described above, the outer perimeter of the back panel 350 comprises a bevel B and can be formed from the same fluorescent material as the previous embodiments to create the same beveled surface and can comprise the same edge glow effect (see FIG. 22). Further, as similarly described above, the back panel 350 comprises a cutout 351 that is configured to provide access to other portions of the electronic device D, for example, a camera or other component of the electronic device D. According to some example embodiments, the cutout 351 of the back panel can similarly comprise a bevel B, for example, so as to similarly provide an edge glow effect.

According to example embodiments, as described herein, the electronic device case preferably comprises a back panel and a frame overmolded to the back panel so as to form a unitary and integral case for at least partially covering the electronic device D. According to example embodiments and as described herein, preferably one or more additional components or features can be incorporated with the cases as described herein, for example, to provide one or more reservoirs for retaining a liquid or other material, or for example, to provide a recessed area or reservoir such that a material can be poured therein and cured. Preferably, in any of the embodiments as described herein, the back panel and frame are preferably configured to permanently connect with each other once the frame is overmolded with the back panel. In example embodiments, the back panel and frame preferably comprise some kind of interengagement features (e.g., rib and slot, male and female features) so as to provide a contact surface area to ensure adequate bonding therebetween (see FIGS. 3-5). Furthermore, as described herein with respect to each of the cases 10, 100, 200, 300, the outer perimeter of the respective back panels 50, 150, 250, 350 comprise a bevel B, for example, so as to provide an edge glow effect (as described above). According to some example embodiments, the bevel B extends around the entirety of the outer perimeter of the back panel. According to other example embodiments, the bevel B may only extend around a portion thereof, for example, so as to provide one or more bevel segments, or for example, a discontinuous bevel arrangement, or for example, an outer perimeter comprising alternating bevel and edge or rounded segments.

While the invention has been described with reference to example embodiments, it will be understood by those skilled in the art that a variety of modifications, additions and deletions are within the scope of the invention, as defined by the following claims.

What is claimed is:

1. A case for a portable electronic device comprising:
a resilient, flexible frame configured to extend around an outer periphery of the device; and
a rigid back panel configured to cover the back of the device and comprising a front, interior surface and a back, exterior surface, wherein the back panel is either transparent or translucent,
wherein the frame is overmolded onto the front, interior surface of the back panel; and
wherein the frame is formed from thermoplastic polyurethane.

2. The case of claim 1, wherein the back panel is formed from polycarbonate.

3. The case of claim 1, wherein the back panel is tinted a florescent color.

4. The case of claim 1, wherein the back panel comprises a cavity for sealingly containing one or more materials.

5. The case of claim 1, wherein the back panel comprises a bevel provided along at least a portion of an outer perimeter thereof, and wherein the back panel is configured to absorb, internally reflect and re-emit light so as to provide unique visual observations when viewing the back panel or bevel thereof.

6. The case of claim 5, wherein the back panel is configured to produce an edge glow effect along the bevel thereof, the edge glow effect being visible to an observer when the observer is generally positioned and oriented to be viewing the bevel in a direction that is substantially transverse to an outer surface of the back panel.

7. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 wherein the back panel is formed from polycarbonate.

8. The case of claim 7, wherein the back panel is tinted a florescent color.

9. The case of claim 7, wherein the back panel comprises a cavity for sealingly containing one or more materials.

10. The case of claim 7, wherein the back panel comprises a bevel provided along at least a portion of an outer perimeter thereof, and wherein the back panel is configured to absorb, internally reflect and re-emit light so as to provide unique visual observations when viewing the back panel or bevel thereof.

11. The case of claim 10, wherein the back panel is configured to produce an edge glow effect along the bevel thereof, the edge glow effect being visible to an observer when the observer is generally positioned and oriented to be viewing the bevel in a direction that is substantially transverse to an outer surface of the back panel.

12. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 wherein the back panel is tinted a florescent color.

13. The case of claim 12, wherein the back panel comprises a cavity for sealingly containing one or more materials.

14. The case of claim 12, wherein the back panel comprises a bevel provided along at least a portion of an outer perimeter thereof, and wherein the back panel is configured to absorb, internally reflect and re-emit light so as to provide unique visual observations when viewing the back panel or bevel thereof.

15. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 wherein the back panel frame comprises a rib positioned on a front surface thereof that is configured for engagement with a slot of the frame.

16. The case of claim 14, wherein the back panel is configured to produce an edge glow effect along the bevel thereof, the edge glow effect being visible to an observer when the observer is generally positioned and oriented to be viewing the bevel in a direction that is substantially transverse to an outer surface of the back panel.

17. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 further comprising at least one button, wherein the button is configured to engage a cutout in the frame, the cutout being positioned to align with a button on the portable electronic device.

18. The case of claim 17, wherein the design of the button and the design of the cutout in the frame automatically adjusts the position of the button within the cutout, allowing a single button to accommodate device buttons having different button tolerance variations.

19. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 wherein the back panel comprises a cavity for sealingly containing one or more materials.

20. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 further comprising a recess and an inset shelf surrounding the recess, wherein the recess and inset shelf are formed along a front, interior portion of the back panel.

21. The case of claim 20, further comprising a panel attached to the inset shelf of the back panel such that a cavity is defined between the panel and the back panel.

22. The case of claim 21, further comprising a second panel configured for attachment to the back panel so as to define two cavities.

23. A case for a portable electronic device comprising:
 a resilient, flexible frame configured to extend around an outer periphery of the device; and
 a rigid back panel configured to cover the back of the device and comprising a front, interior surface and a back, exterior surface, wherein the back panel is either transparent or translucent,
 wherein the frame is overmolded onto the front, interior surface of the back panel; and
 further comprising a recess formed on a back, exterior portion of the back panel.

24. The case of claim 23, further comprising at least one layer of epoxy occupying the cavity.

25. The case of claim 23, further comprising at least one design element deposited in the recess and contained therein by the epoxy.

26. A case for an electronic device comprising:
a back panel comprising a bevel, the bevel being provided along at least a portion of the outer perimeter thereof; and
a frame comprising a plurality of outer sidewalls surrounding a center cutout, the frame overmolded to the back panel,
wherein the back panel is configured to absorb, internally reflect and re-emit light particles so as to provide unique visual observations when viewing the back panel or bevel thereof.

27. The case of claim 26, wherein the back panel is configured to produce an edge glow effect along the bevel thereof, the edge glow effect being visible to an observer when the observer is generally positioned and oriented to be viewing the beveled surface in a direction that is substantially transverse to an outer surface of the back panel.

28. The case of claim 26, wherein the frame comprises thermoplastic polyurethane.

29. The case of claim 26, wherein the back panel comprises polycarbonate.

30. The case of claim 26, wherein the back panel is tinted a florescent color.

31. The case of claim 26, wherein the back panel comprises a cavity for sealingly containing one or more materials.

32. The case of claim 26, further comprising a recess and an inset shelf surrounding the recess, wherein the recess and inset shelf are formed along a front, interior portion of the back panel.

33. The case of claim 32, further comprising a panel attached to the inset shelf of the back panel such that a cavity is defined between the panel and the back panel.

34. The case of claim 33, further comprising a second panel configured for attachment to the back panel so as to define two cavities.

35. A back panel for an electronic device case comprising a substantially planar and transparent or translucent panel defining a thickness and an outer perimeter, the panel comprising a bevel provided along at least a portion of the outer perimeter thereof, wherein the back panel is configured to absorb, internally reflect and re-emit ultra-violet light particles in the visible spectrum so as to provide unique visual observations when viewing the back panel or bevel thereof.

* * * * *